United States Patent
Furton

(10) Patent No.: US 12,205,392 B2
(45) Date of Patent: Jan. 21, 2025

(54) IMAGE PROCESSING APPARATUS THAT EXTRACTS NECESSARY CHARACTER STRING FROM SOURCE IMAGE, AND IMAGE FORMING APPARATUS INCLUDING SAME

(71) Applicant: KYOCERA Document Solutions Inc., Osaka (JP)

(72) Inventor: Starra Jane Furton, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 388 days.

(21) Appl. No.: 17/694,895

(22) Filed: Mar. 15, 2022

(65) Prior Publication Data

US 2022/0309816 A1 Sep. 29, 2022

(30) Foreign Application Priority Data

Mar. 24, 2021 (JP) ................................. 2021-050455

(51) Int. Cl.
*G06V 30/412* (2022.01)
*H04N 1/32* (2006.01)

(52) U.S. Cl.
CPC ....... *G06V 30/412* (2022.01); *H04N 1/32475* (2013.01)

(58) Field of Classification Search
None
See application file for complete search history.

(56) References Cited

U.S. PATENT DOCUMENTS

2020/0090539 A1* 3/2020 He .................. G06N 3/045
2021/0012102 A1* 1/2021 Cristescu .............. G06F 40/284

FOREIGN PATENT DOCUMENTS

JP 2004029107 A * 1/2004
JP 2013012223 A 1/2013

OTHER PUBLICATIONS

Translation for JP 2004-029107 (Year: 2004).*

* cited by examiner

*Primary Examiner* — Lennin R Rodriguezgonzalez
(74) *Attorney, Agent, or Firm* — IP Business Solutions, LLC.

(57) ABSTRACT

An image forming apparatus includes a control device, acting as a controller that analyzes a source image acquired through a reading operation by the document reading device, detects a response input field included in the source image and a question item corresponding to the response input field, on a basis of predetermined format information, extracts a character string representing the response written in the response input field, and additionally writes the extracted character string, in the character string file already stored in the character string file storage device and designated by the user through the operation device, in association with the character string representing the question item, recorded in the character string file.

7 Claims, 21 Drawing Sheets

Fig.3

TRAVEL INQUIRY FORM

THANK YOU FOR ABC AGENCY TO RESEARCH A FARE FOR YOUR UPCOMING TRIP.

NAME  [TARO] [SATO]
FIRST NAME  LAST NAME

E-MAIL  [TARO@ABC.XYZ]
EXAMPLE@EXAMPLE.XYZ

PHONE NUMBER [+81] [1234567890]
AREA CODE  MOBILE NUMBER

NUMBER OF ADULT TRAVELERS
[7]

NUMBER OF CHILDREN TRAVELERS
[0]

WHERE WOULD YOU LIKE TO TRAVEL?
[KUALA LUMPUR, MALAYSIA]

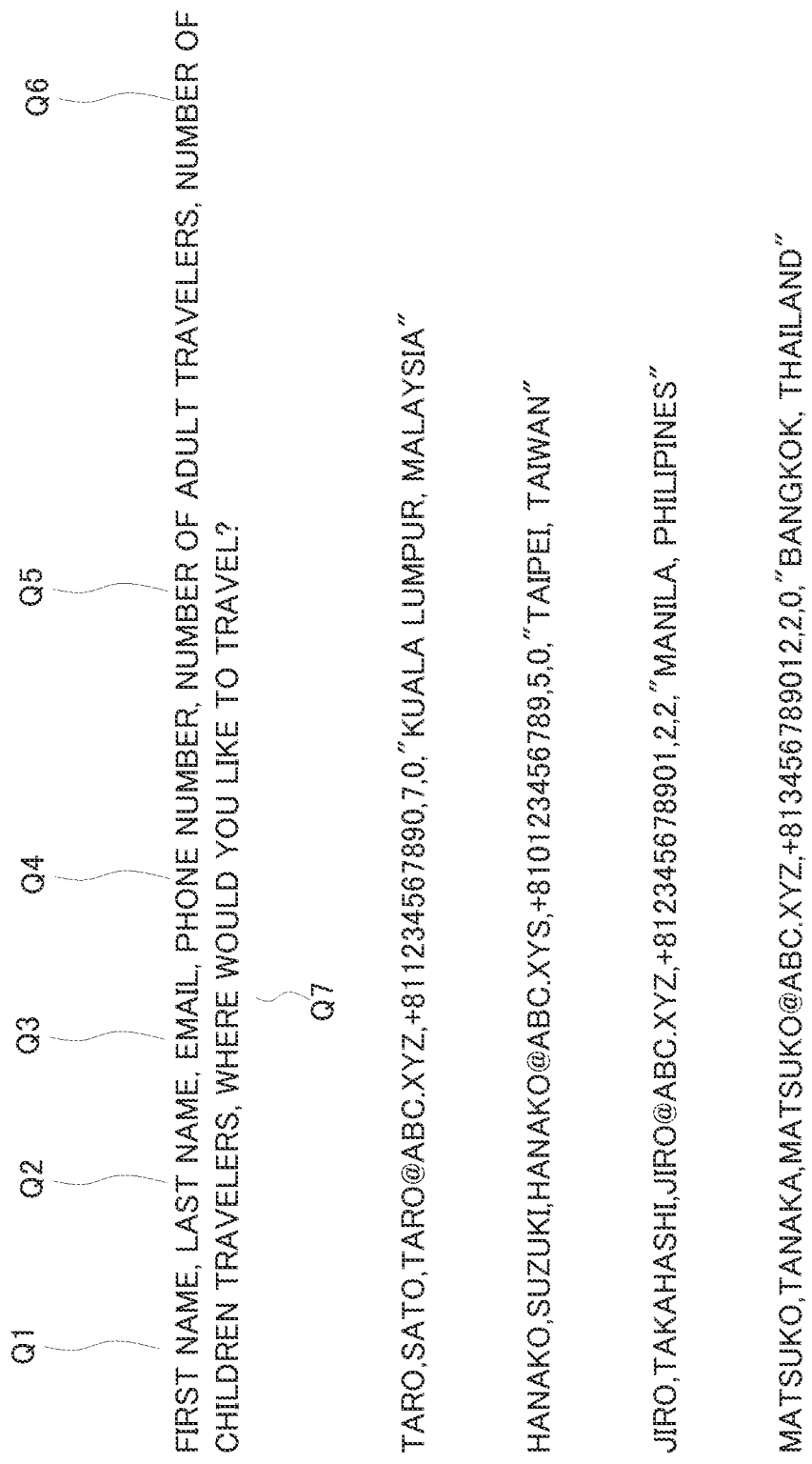

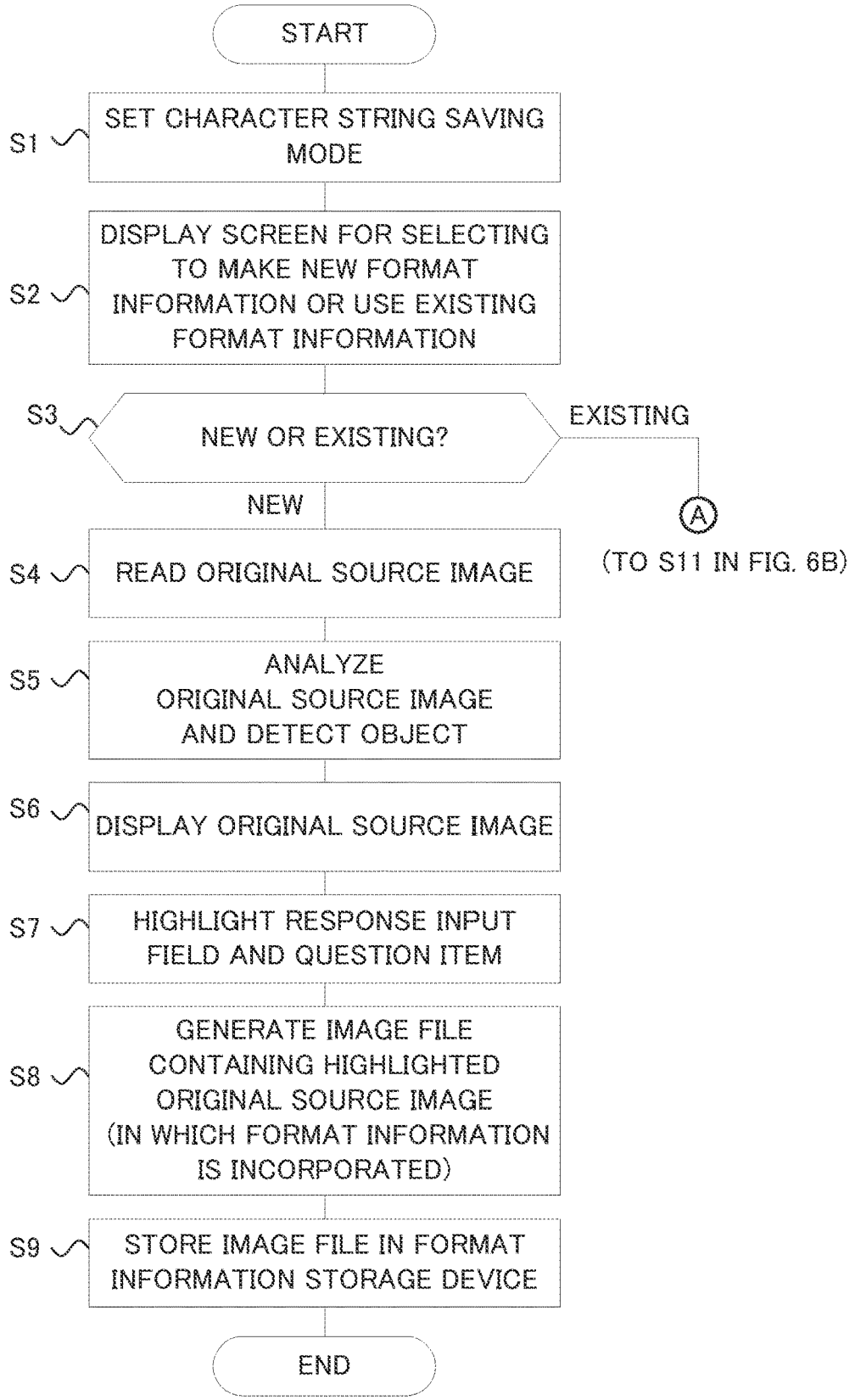

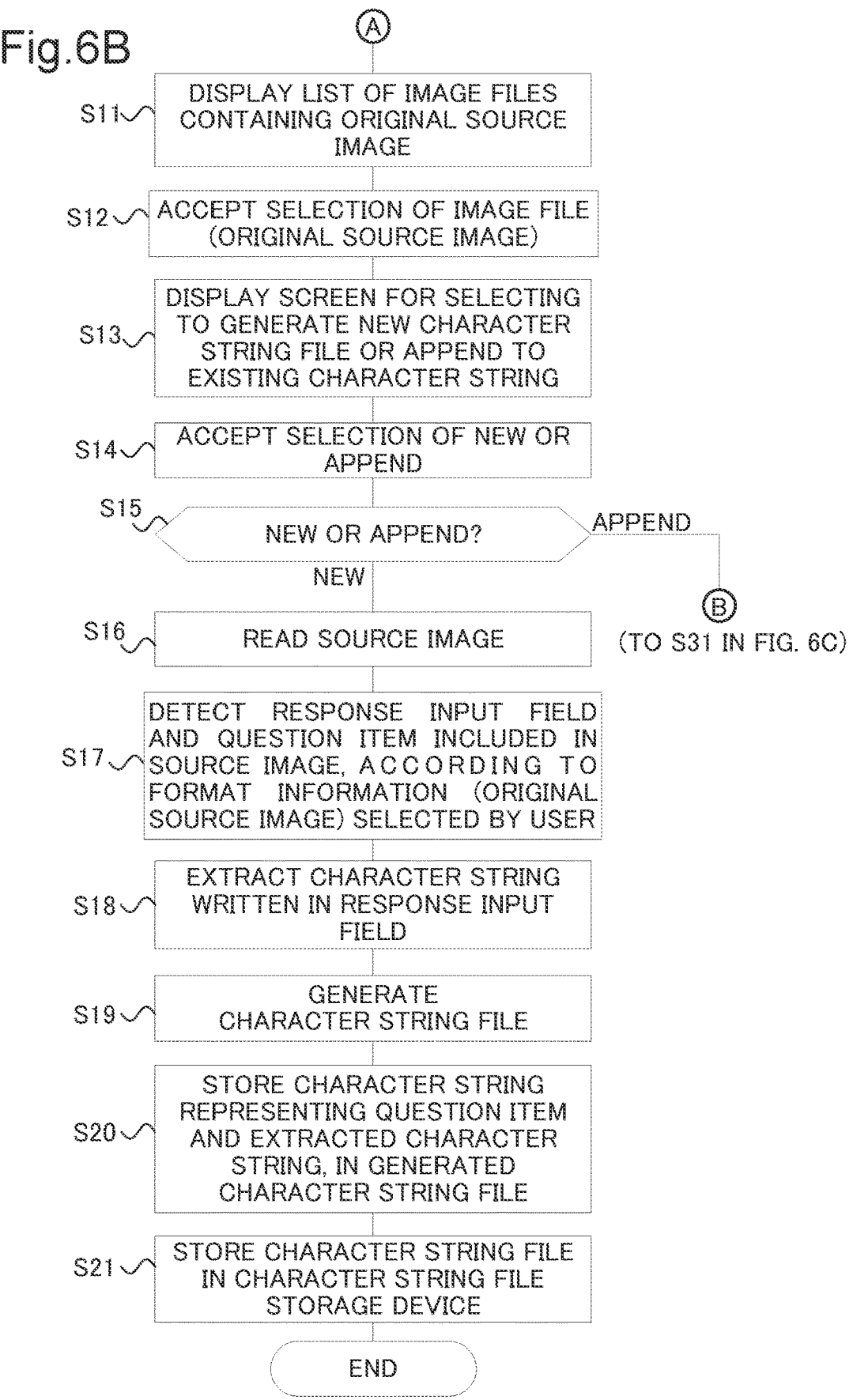

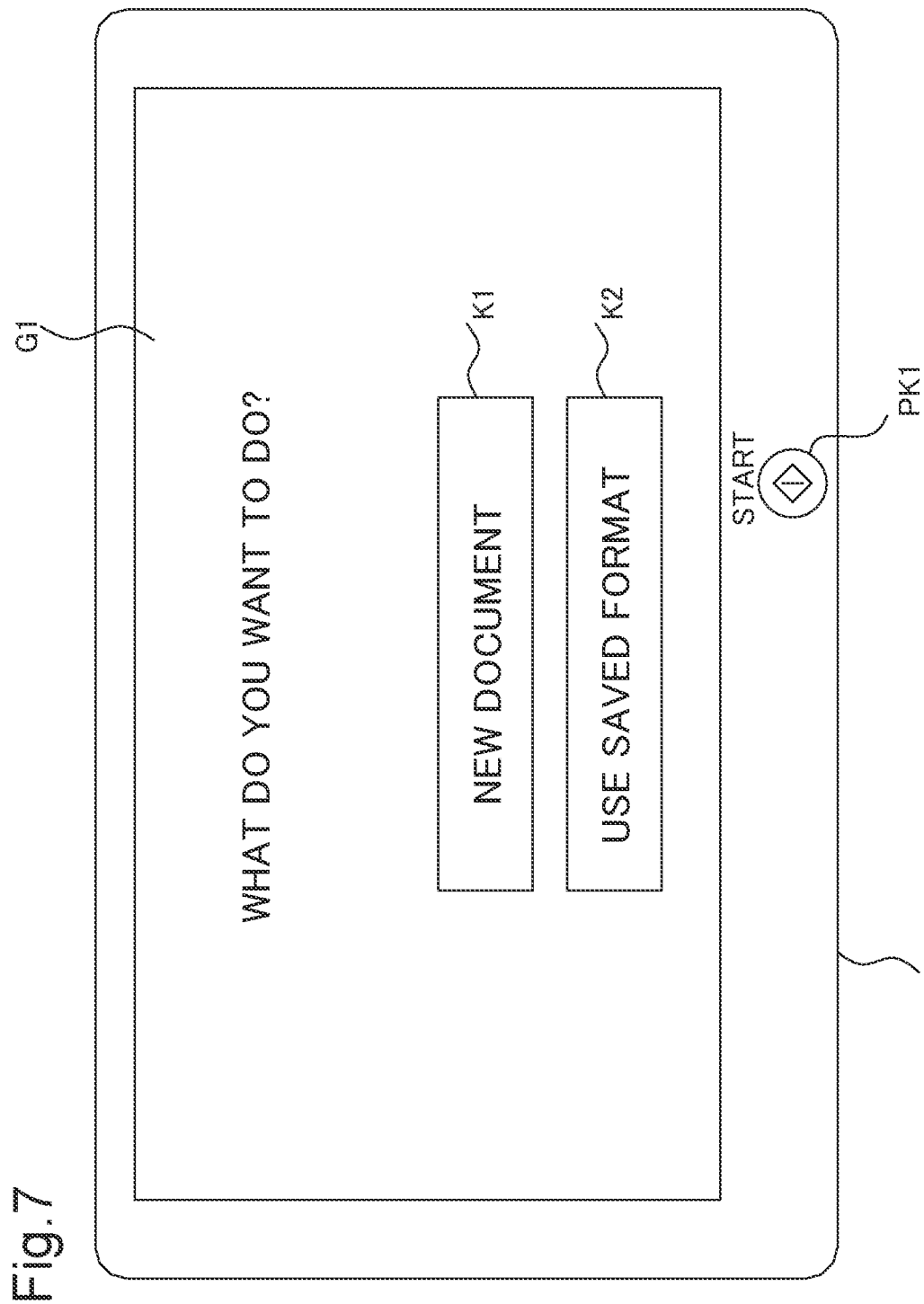

Fig.8  D11

TRAVEL INQUIRY FORM

THANK YOU FOR ABC AGENCY TO RESEARCH A FARE FOR YOUR UPCOMING TRIP.

NAME  
FIRST NAME   LAST NAME

E-MAIL  
EXAMPLE@EXAMPLE.XYZ

PHONE NUMBER  
AREA CODE   MOBILE NUMBER

NUMBER OF ADULT TRAVELERS

NUMBER OF CHILDREN TRAVELERS

WHERE WOULD YOU LIKE TO TRAVEL?

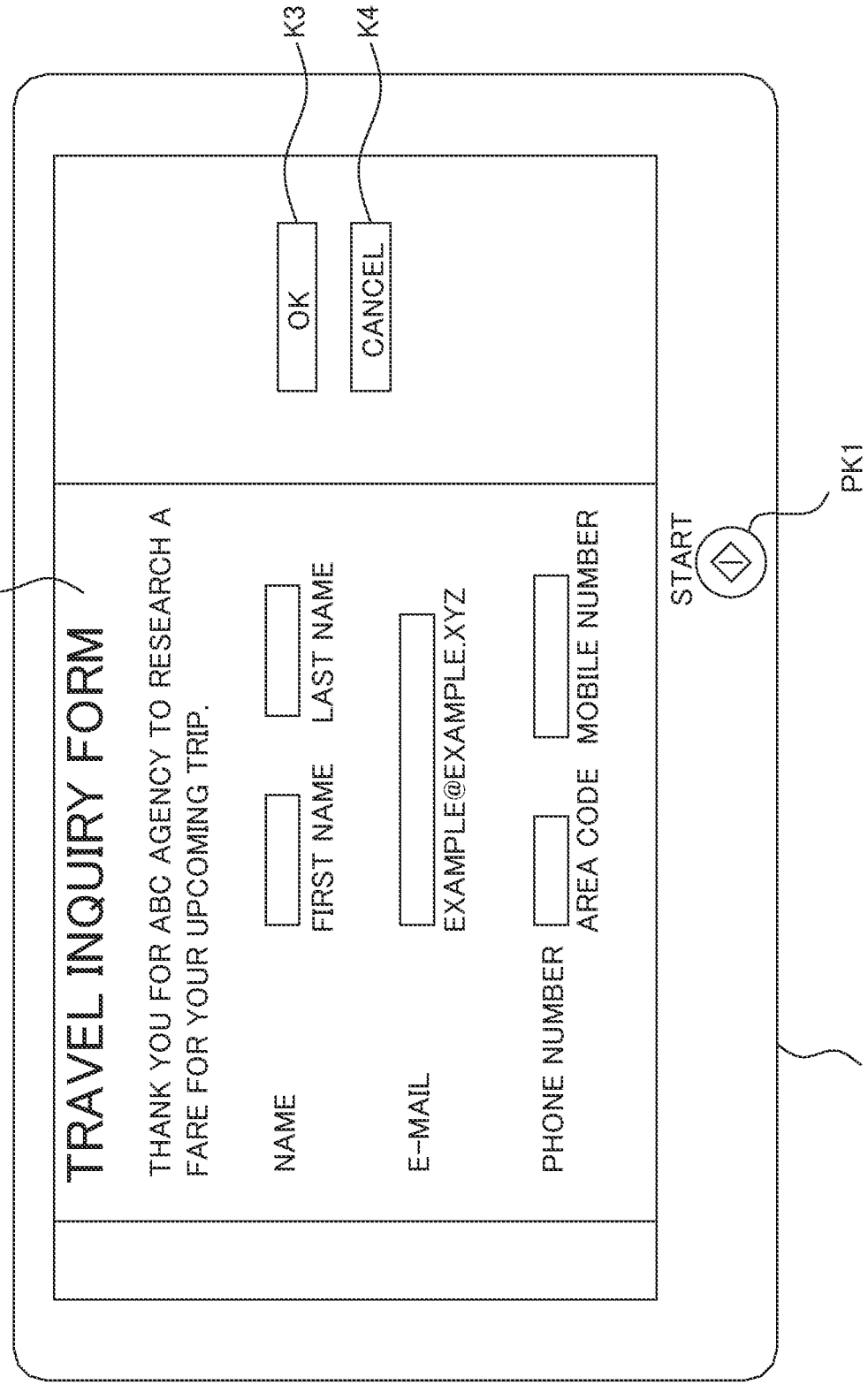

Fig.11

TRAVEL INQUIRY FORM

THANK YOU FOR ABC AGENCY TO RESEARCH A FARE FOR YOUR UPCOMING TRIP.

FIRST NAME, LAST NAME, EMAIL, PHONE NUMBER, NUMBER OF ADULT TRAVELERS, NUMBER OF CHILDREN TRAVELERS, WHERE WOULD YOU LIKE TO TRAVEL?
　　　　　　　　　　　　　　　　Q7

TARO,SATO,TARO@ABC.XYZ,+81123456789,0,7,0,"KUALA LUMPUR, MALAYSIA"

HANAKO,SUZUKI,HANAKO@ABC.XYS,+81012345678,9,5,0,"TAIPEI, TAIWAN"

JIRO,TAKAHASHI,JIRO@ABC.XYZ,+81234567890,1,2,2,"MANILA, PHILIPINES"

MATSUKO,TANAKA,MATSUKO@ABC.XYZ,+81345678901,2,2,0,"BANGKOK, THAILAND"

SABURO,ITO,SABURO@ABC.XYZ,+81456789012,3,1,2,"SHANGHAI, CHINA" ⎫
　　　　　　　　　　　　　　　　　　　　　　　　　　　　　　　　⎬ ADDED
TAKEKO,WATANABE,TAKEKO@ABC.XYS,+81567890123,4,1,0,"JAKARTA, INDONESIA" ⎪

UMEKO,YAMAMOTO,UMEKO@ABC.XYZ,+81678901234,5,4,0,"SEOUL, SOUTH KOREA"

IMAGE PROCESSING APPARATUS THAT EXTRACTS NECESSARY CHARACTER STRING FROM SOURCE IMAGE, AND IMAGE FORMING APPARATUS INCLUDING SAME

INCORPORATION BY REFERENCE

This application claims priority to Japanese Patent Application No. 2021-050455 filed on Mar. 24, 2021, the entire contents of which are incorporated by reference herein.

BACKGROUND

The present disclosure relates to an image processing apparatus and an image forming apparatus, and in particular to a technique to extract a necessary character string from a source image.

An image processing apparatus is known that performs character recognition on an image acquired by scanning a questionnaire, and stores the character recognition result in a memory.

SUMMARY

The disclosure proposes further improvement of the foregoing techniques.

In an aspect, the disclosure provides an image processing apparatus including a character string file storage device, an operation device, a document reading device, and a control device. The character string file storage device stores therein a character string file in which a character string representing a question item, and a character string representing a response to the question item are registered in association with each other. The operation device receives an input. The document reading device reads an image of a source document. The control device includes a processor, and acts as a controller when the processor executes a control program. The controller analyzes a source image acquired through a reading operation by the document reading device, detects, on a basis of predetermined format information indicating a response input field in which a response to be extracted from the source image is written, and the question item corresponding to the response input field, the response input field and the question item contained in the source image, extracts the character string representing the response written in the response input field, and additionally writes the extracted character string, in the character string file already stored in the character string file storage device and designated by a user through the operation device, in association with the character string representing the question item, recorded in the character string file.

In another aspect, the disclosure provides an image forming apparatus including the foregoing image processing apparatus, and an image forming device that forms an image on a recording medium.

BRIEF DESCRIPTION OF THE DRAWINGS

FIG. 3 is a schematic drawing showing an example of a source image;

FIG. 5 is a schematic drawing showing an example of a CSV file;

FIG. 6A is a flowchart showing an operation performed under a character string saving mode;

FIG. 6B is a flowchart showing the operation performed under the character string saving mode;

FIG. 7 is a schematic drawing showing an example of a selection screen displayed on a display device;

FIG. 8 is a schematic drawing showing an example of an original source image;

FIG. 9 is a schematic drawing showing the original source image displayed on the display device;

FIG. 11 is a schematic drawing showing the entirety of the original source image displayed in the highlighted state;

FIG. 16 is a schematic drawing showing an example of an updated CSV file;

DETAILED DESCRIPTION

Figure 1:
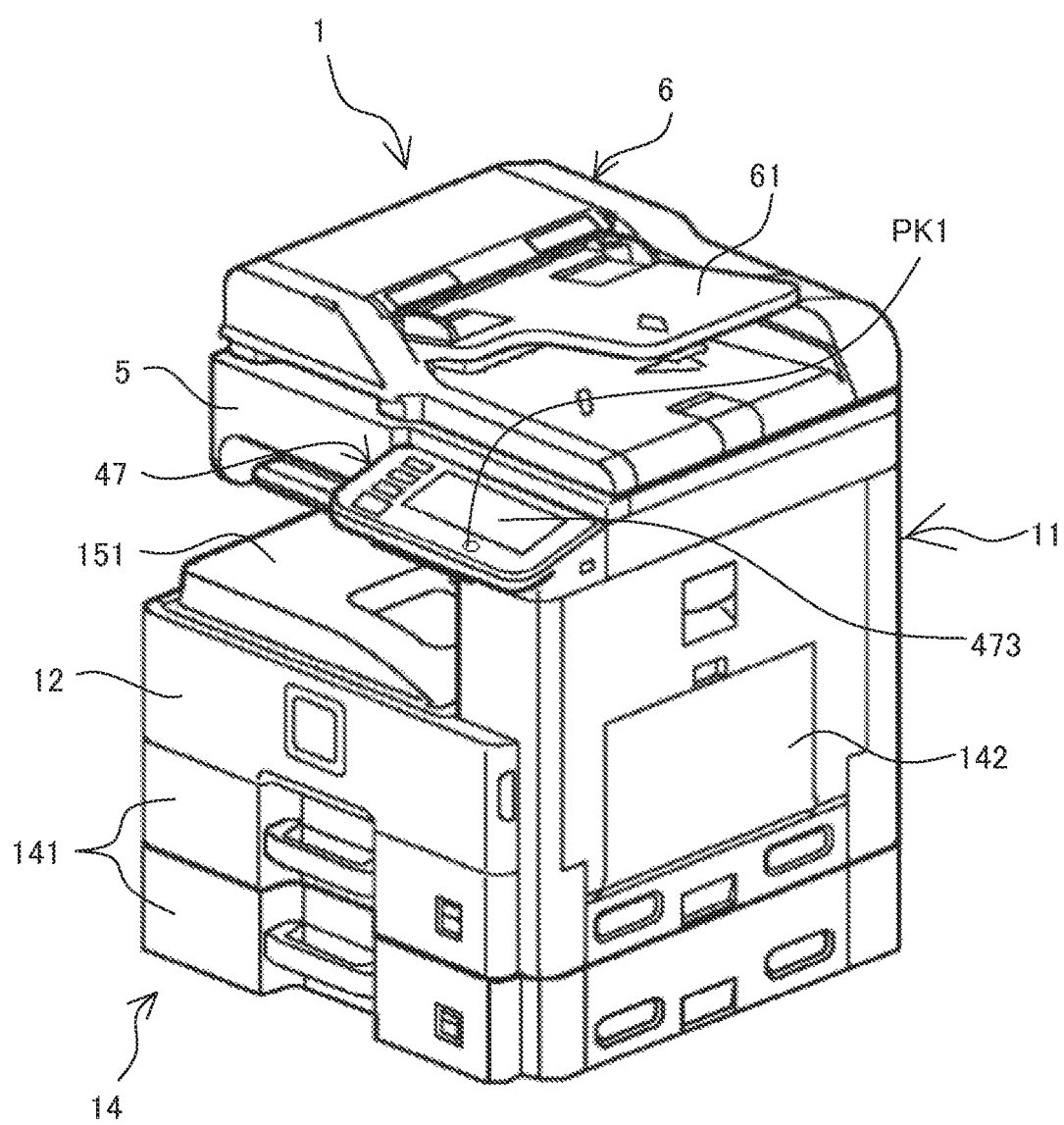
FIG. 1 is a perspective view showing the appearance of an image forming apparatus including an image processing apparatus according to an embodiment of the disclosure.
Figure 2:
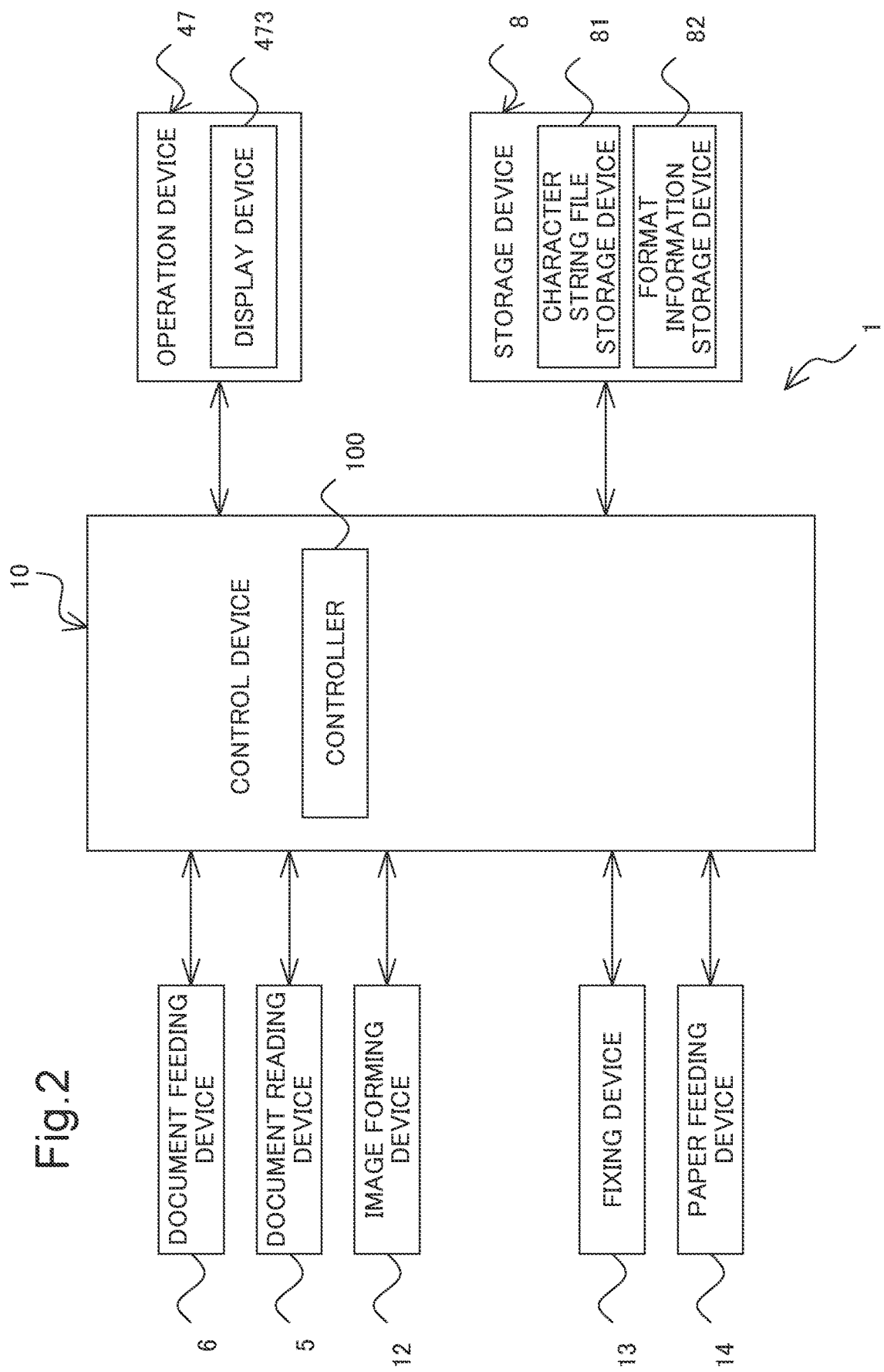
FIG. 2 is a functional block diagram showing an essential internal configuration of the image forming apparatus.

Hereafter, an image processing apparatus and an image forming apparatus according to an embodiment of the disclosure will be described, with reference to the drawings. FIG. 1 is a perspective view showing the appearance of the image forming apparatus including the image processing apparatus according to the embodiment of the disclosure. FIG. 2 is a functional block diagram showing an essential internal configuration of the image forming apparatus.

The image forming apparatus 1 is a multifunction peripheral having a plurality of functions, such as copying, printing, scanning, and facsimile transmission, and includes, inside a main body 11, a control device 10, a document feeding device 6, a document reading device 5, an image forming device 12, a fixing device 13, a paper feeding device 14, an operation device 47, and a storage device 8.

The document feeding device 6 is provided on the upper face of the document reading device 5, so as to be opened and closed via a non-illustrated hinge or the like. The document feeding device 6 serves as a document retention cover, when a source document placed on a non-illustrated platen glass is to be read. The document feeding device 6 is configured as an automatic document feeder (ADF) including a document tray 61, and delivers the source documents placed on the document tray 61, to the document reading device 5 one by one.

The document feeding device 6 is configured to mechanically reverse the front face and the back face of the source document, after the document reading device 5 has read the image on the front face, and to again feed the source document to the document reading device 5. Thus, the document reading device 5 can read both sides of the source document.

To perform the document reading operation, the image forming apparatus 1 operates as follows. The document reading device 5 optically reads the image on a source document, delivered thereto from the document feeding device 6 or placed on the platen glass, and generates image data. The image data generated by the document reading device 5 is stored, for example, in a non-illustrated image memory.

To perform the image forming operation, the image forming apparatus 1 operates as follows. The image recording device 12 forms a toner image on a recording sheet, exemplifying the recording medium in the disclosure, delivered from the paper feeding device 14, on the basis of the image data generated through the document reading operation, the image data stored in the image memory, or image data received from a computer connected via a network.

The fixing device 13 heats and presses the recording sheet on which the toner image has been formed by the image forming device 12, to thereby fix the toner image onto the recording sheet. The recording sheet that has undergone the fixing process is delivered to an output tray 151. The paper feeding device 14 includes a plurality of paper cassettes 141.

The operation device 47 receives instructions from the user to execute the functions and operations that the image forming apparatus 1 is configured to perform, such as an image forming operation. The operation device 47 includes a display unit 473 for displaying, for example, an operation guide for the user. The operation device 47 also receives, through a touch panel provided on the display device 473, an input of a user's instruction based on an operation performed by the user on the operation screen of the display device 473 (touch operation).

The operation device 47 also receives an instruction from the user, inputted by the user with physical keys provided on the operation device 47. For example, the operation device 47 includes a physical key PK1, serving as a start key for instructing to start the copying or scanning operation, or start the processing of a specified operation.

The display device 473 includes, for example, a liquid crystal display (LCD). The display device 473 includes the touch panel. When the user touches a button or a key displayed on the screen, the touch panel receives the instruction corresponding to the touched position.

The storage device 8 is a large-capacity memory unit such as a hard disk drive (HDD) or a solid state drive (SSD), containing various types of control programs, and includes a character string file storage device 81, and a format information storage device 82. The character string file storage device 81 and the format information storage device 82 will be subsequently described in detail.

The control device 10 includes a processor, a random-access memory (RAM), a read-only memory (ROM), and an exclusive hardware circuit. The processor is, for example, a central processing unit (CPU), an application specific integrated circuit (ASIC), or a micro processing unit (MPU). The control device 10 includes a controller 100.

The controller 100 controls the overall operation of the image forming apparatus 1. The controller 100 is connected to the document feeding device 6, the document reading device 5, the image forming device 12, the fixing device 13, the paper feeding device 14, the operation device 47, and the storage device 8, to control the operation of the mentioned components. For example, the controller 100 controls the operation of the image forming device 12, so as to form the image of the source document, acquired through the reading operation by the document reading device 5, on the recording sheet exemplifying the recording medium in the disclosure.

The image forming apparatus is configured to perform a character string saving mode, including "saving a character string read out from the source image". The controller 100 sets the image forming apparatus 1 to the character string saving mode, according to a mode setting instruction inputted by the user through the operation device 47.

An example where the document reading device 5 reads a source image D1 shown in FIG. 3, when the image forming apparatus 1 is set to the character string saving mode, will be described hereunder. The source image D1 shown in FIG. 3 includes character strings indicating question items Q1 to Q7 (e.g., First Name, Last Name, E-mail, Phone Number), and response input fields EF1 to EF7, in which the responses to the respective question items Q1 to Q7 are to be inputted.

The controller 100 analyzes the source image D1 using a known optical character recognition (OCR), and detects response input fields EF1 to EF7 and question items Q1 to Q7 included in the source image D1, on the basis of predetermined format information FM1 (see, for example, FIG. 4) indicating the response input fields in which the response to be extracted from the source image D1 is inputted, and the question items respectively corresponding to the response input fields.

Figure 4:
FIG. 4 is a table showing an example of format information.

FIG. 4 illustrates an example of the format information. The format information FM1 shown in FIG. 4 includes sizes and positions of the respective response input fields EF1 to EF7 on the source image, and sizes and positions of the respective question items Q1 to Q7 on the source image, respectively corresponding to the response input fields EF1 to EF7.

The controller 100 extracts the character strings written in the response input fields EF1 to EF7 (e.g., "Taro", "Sato", "taro@abc.xyz", and "+811234567890"). The controller 100 then generates character string files, in each of which the extracted character string is recorded in association with the character string representing one of the question items Q1 to Q7 (e.g., "First Name", "Last Name", "E-mail", and "Phone Number"), and stores the character string files generated as above in the character string file storage device 81.

The character string file is of a comma separated value (CSV) format, in which the character string representing the question item and the character string representing the response to the question item can be recorded, in association with each other. FIG. 5 illustrates an example of the CSV file. In the CSV file shown in FIG. 5, the character strings (question item names) respectively representing the question items Q1 to Q7 are sequentially aligned with a ", (comma)" between each other, in the first line. In each of the second and subsequent lines, the character strings each representing the response written in one of the response input fields EF1 to EF7, respectively corresponding to the question items Q1 to Q7, are aligned with a "," between each other, in the same order as the corresponding question items. In other words, the first line represents the question item, and the second and subsequent lines each represent the response to the corresponding question item.

Since the data is separated by a comma in the CSV file, the data including therein a comma is unable to be correctly separated. Accordingly, when the character string extracted from the response input field includes a comma, the controller 100 encloses the character string including the comma with a predetermined symbol (e.g., double quotation marks), before writing the character string in the character string file. For example, as shown in FIG. 5, such character strings as "Kuala Lumpur, Malaysia" and "Taipei, Taiwan", which are the responses to the question item Q7, are enclosed in the double quotation marks.

Figure 6C:
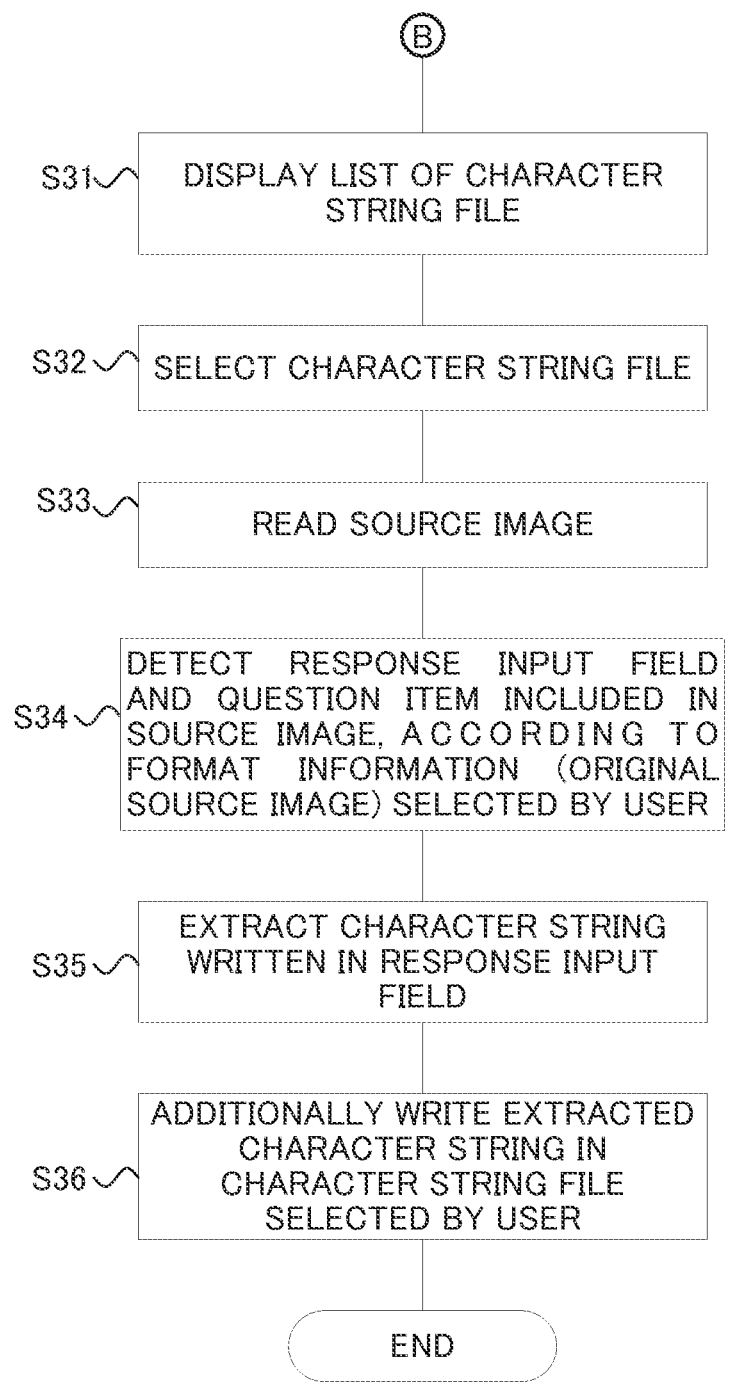
FIG. 6C is a flowchart showing the operation performed under the character string saving mode.

Referring now to flowcharts shown in FIG. 6A to FIG. 6C, an operation performed in the character string saving mode will be described hereunder.

When the user inputs an instruction to set the character string saving mode through the touch panel, for example by touching the graphical user interface (GUI) displayed on the screen of the display device 473, the controller 100 sets the image forming apparatus 1 to the character string saving mode, according to the instruction inputted (S1). The controller 100 then causes the display device 473 to display an operation screen G1 for selection by the user, for example as shown in FIG. 7 (S2).

The operation screen G1 shown in FIG. 7 includes a selection key K1 marked as "New Document" for setting up new format information, and a selection key K2 marked as "Use Saved Format", for utilizing existing format information stored in the format information storage device 82.

When the user touches one of the selection keys K1 and K2 on the operation screen G1, the controller 100 accepts the selection to set up the new format information, or to utilize the existing format information, depending on which of the selection keys has been touched.

In the case of setting up the new format information, the user sets an original document, serving as the base of the format information, on the document tray 61, and touches a physical key PK1, which is the "start" key on the operation device 47. FIG. 8 illustrates an example of an original source image D11.

When the user selects to set up the new format information ("New" at S3), and then the operation device 47 detects that the user has touched the physical key PK1, the controller 100 controls the document feeding device 6 and the document reading device 5, so as to cause the document reading device 5 to read the image of the original document placed on the document tray 61 (S4).

Then the controller 100 analyzes the original source image acquired through the reading operation by the document reading device 5, and detects, using the known OCR technique, objects such as character strings and rectangular frames included in the original source image, with the size and position of each of the objects (S5). The controller 100 then causes the display device 473 to display the original source image (S6). For example as shown in FIG. 9, an original source image D11 is displayed on the display device 473.

The controller 100 causes the display device 473 to display, on the screen shown in FIG. 9, the original source image D11, a selection key K3 marked as "OK", and a selection key K4 marked as "Cancel". When the entirety of the original source image D11 is unable to be displayed on the screen of the display device 473, the controller 100 scrolls the original source image D11 on the screen of the display device 473, according to a swipe operation performed on the screen of the display device 473, inputted through the touch panel provided over the display device 473.

When the user touches one of the objects of the rectangular frame shape, representing the response input field in the original source image D11, on the screen of the display device 473, the controller 100 causes the display device 473 to emphasize (e.g., highlight in yellow) the object displayed at the touched position, on the basis of the detection result acquired at S5, and identifies such object as the response input field, in which the response to be extracted is written (S7).

The controller 100 can accept designation of two or more response input fields located adjacent to each other, as one response input field. When the user successively touches two or more objects of the rectangular frame shape adjacent to each other, within a short time on the screen of the display device 473 displaying the original source image D11, the controller 100 causes the display device 473 to emphasize the display of the two or more objects that have been touched, and identifies these objects as one response input field (S7).

In contrast, when the user touches one of the objects constituted of a character string representing the question item, in the original source image D11 displayed on the screen of the display device 473, the controller 100 causes the display device 473 to emphasize the display of the touched object in a different form from the above (e.g., highlight in blue) on the screen of the display device 473, on the basis of the detection result acquired at S5, and identifies such object as the question item, corresponding to the response input field, in which the response to be extracted is written (S7).

Figure 10:
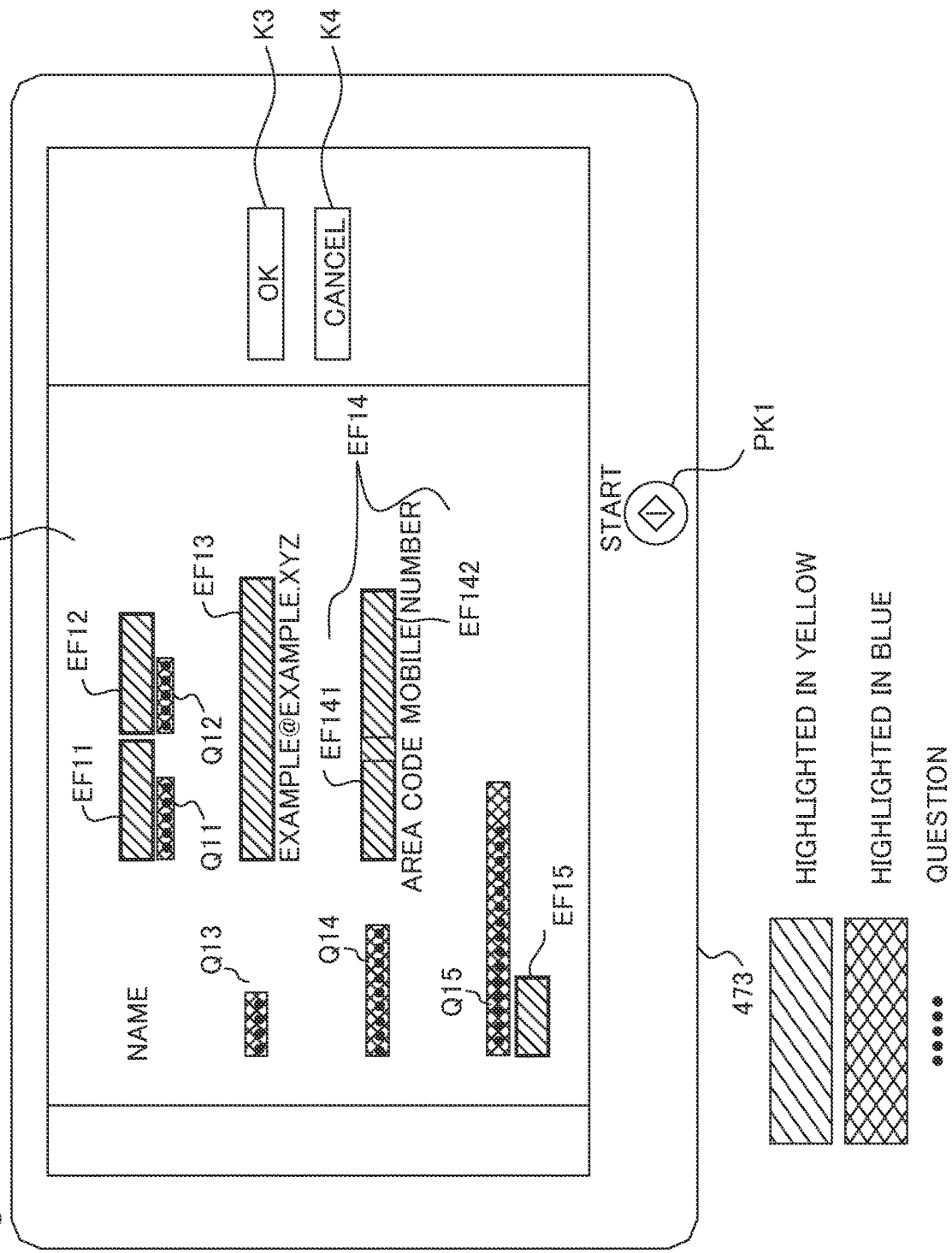
FIG. 10 is a schematic drawing showing the original source image displayed on the display device, in which response input fields and question items designated by the user are highlighted.

FIG. 10 illustrates the original source image D11 displayed on the display device 473, in which the response input fields and the question items designated by the user are highlighted. FIG. 11 illustrates the entirety of the original source image D11 displayed in the highlighted state. In the original source image D11 shown in FIG. 10 and FIG. 11, the response input fields EF11 to EF17 are highlighted, and the question items Q11 to Q17 are also highlighted. The response input field EF14 includes a response input field EF141 and a response input field EF142.

It is the response input fields in each of which the response to be extracted is written, and the character strings representing the question items corresponding to the respective response input fields, that are highlighted. In this state, the controller 100 incorporates, into the original source image displayed as above, the format information indicating the response input fields displayed in the highlighted state, and the character strings representing the question items corresponding to the respective response input fields. As a result, in the highlighted original source image, the format information, indicating the response input fields in each of which the response to be extracted is written, and the question items corresponding to the respective response input fields, are incorporated.

When the user touches the selection key K3 marked as "OK", displayed on the screen shown in FIG. 10, the instruction to generate a file is inputted. The controller 100 generates, according to the instruction inputted, an image file including the highlighted original source image (i.e., original source image in which the format information has been incorporated) (S8), and stores the generated image file in the format information storage device 82 (S9). Thereafter, the operation is finished.

Figure 12:
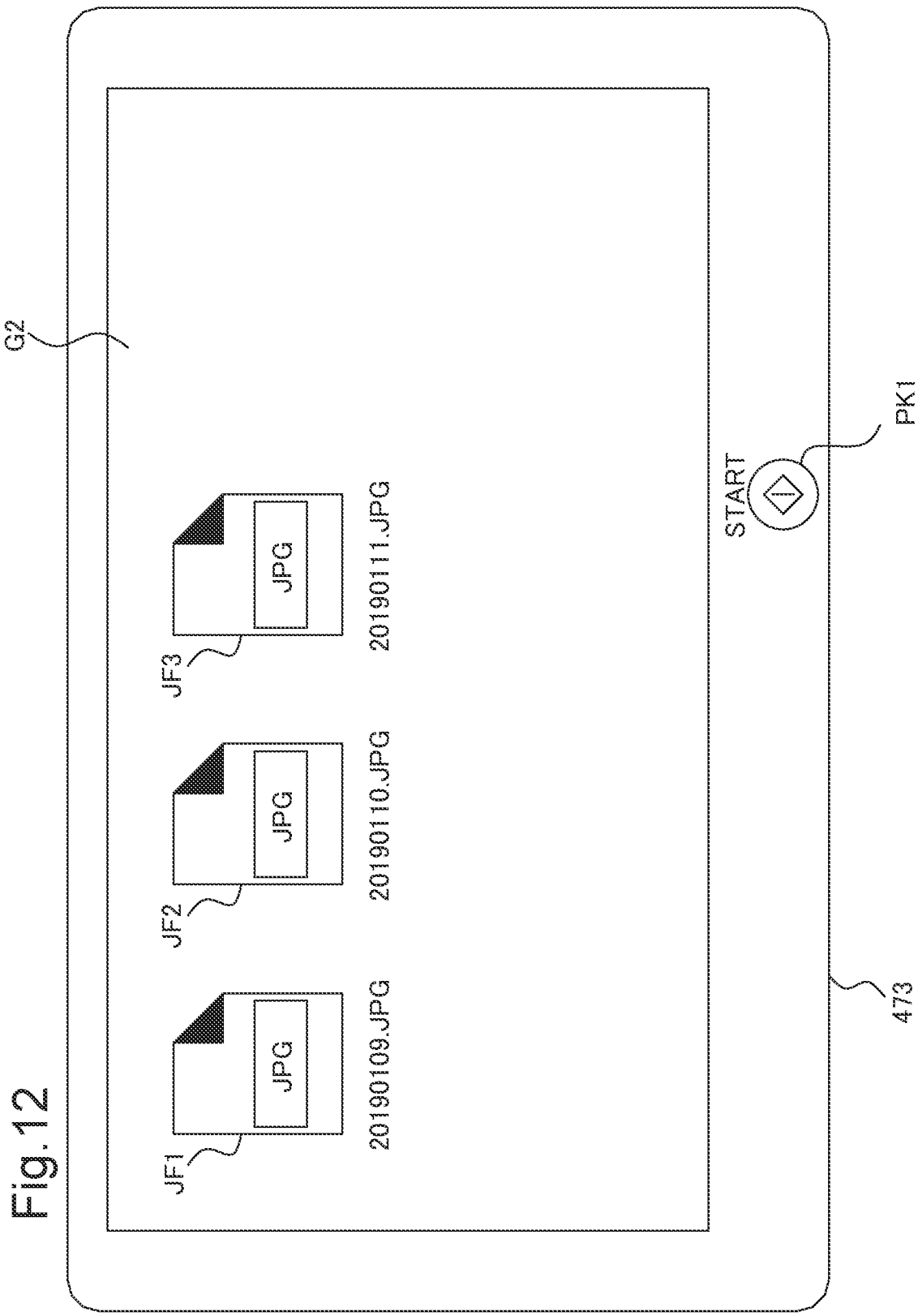
FIG. 12 is a schematic drawing showing image files listed on the display device.

When the user selects utilizing the existing format information ("Existing" at S3), the controller 100 causes the display device 473 to display, as an example shown in FIG. 12, an operation screen G2 including a list of the image files, stored in the format information storage device 82, and containing the original source image in which the format information is incorporated (S11).

For example, the operation screen G2 shown in FIG. 12 includes the image files JF1 to JF3. When the user holds down one of the image files JF1 to JF3 displayed on the display device 473, the controller 100 receives, through the touch panel, an instruction from the user to unfold the image file that has been held down, and causes the display device 473 to display an original source image D12 representing the content of the image file, for example as shown in FIG. 13, according to the instruction.

Figure 13:
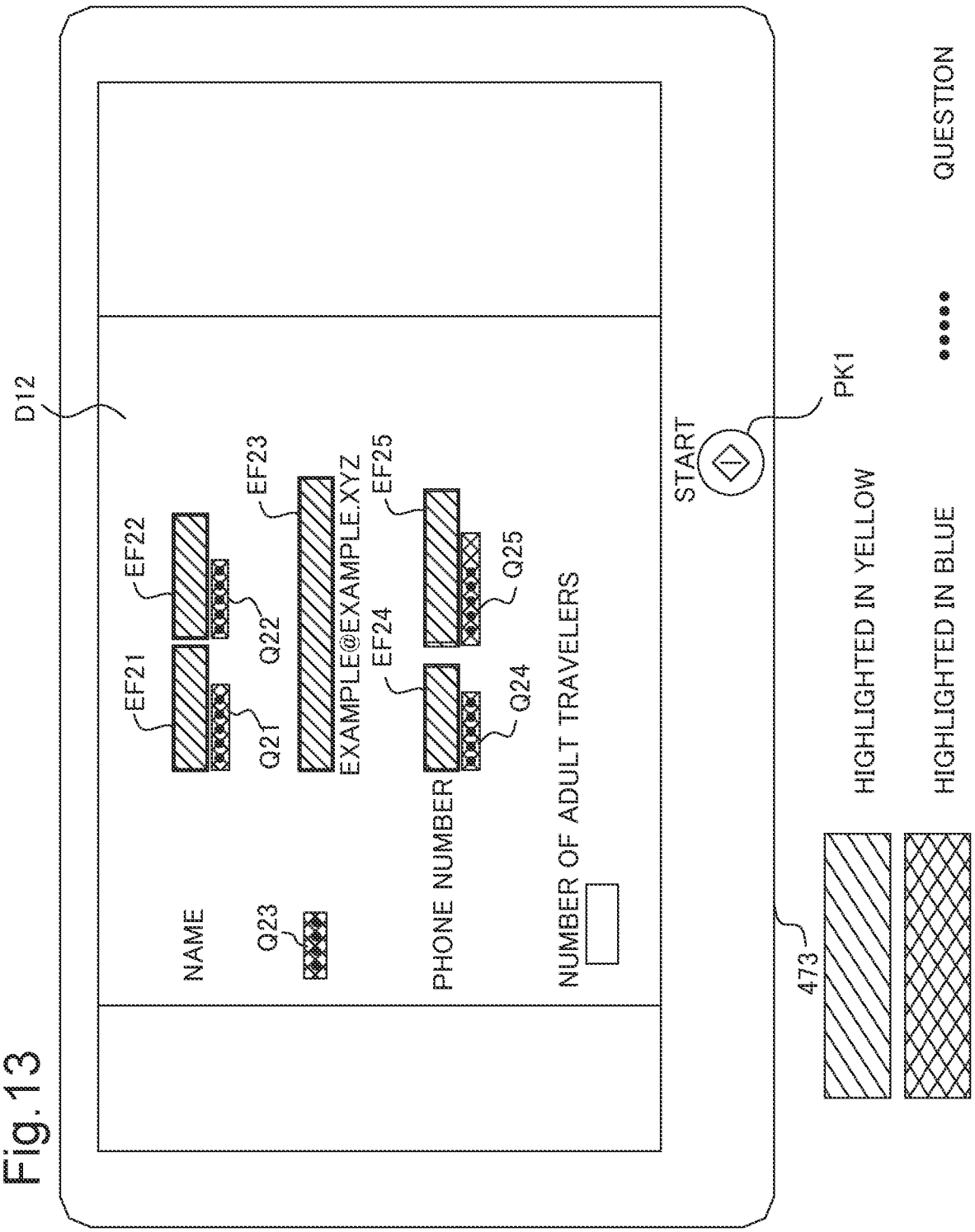
FIG. 13 is a schematic drawing showing an example of an unfolded image file.

In the original source image D12 shown in FIG. 13, the response input fields EF21 to EF25, in each of which the response to be extracted is written, are highlighted in yellow, and the character strings "First Name", "Last Name", "E-mail", "Area Code", and "Mobile Number", representing the question items Q21 to Q25 corresponding to the respective response input fields EF21 to EF25, are highlighted in blue. In view of such display, the user can confirm the format information.

When the user taps, instead of holding down, one of the image files JF1 to JF3 displayed on the display device 473, the controller 100 accepts the selection of the image file (original source image) that has been tapped (S12). Then the controller 100 causes the display device 473 to display an operation screen G3, serving as a selection screen, as an example shown in FIG. 14 (S13).

Figure 14:
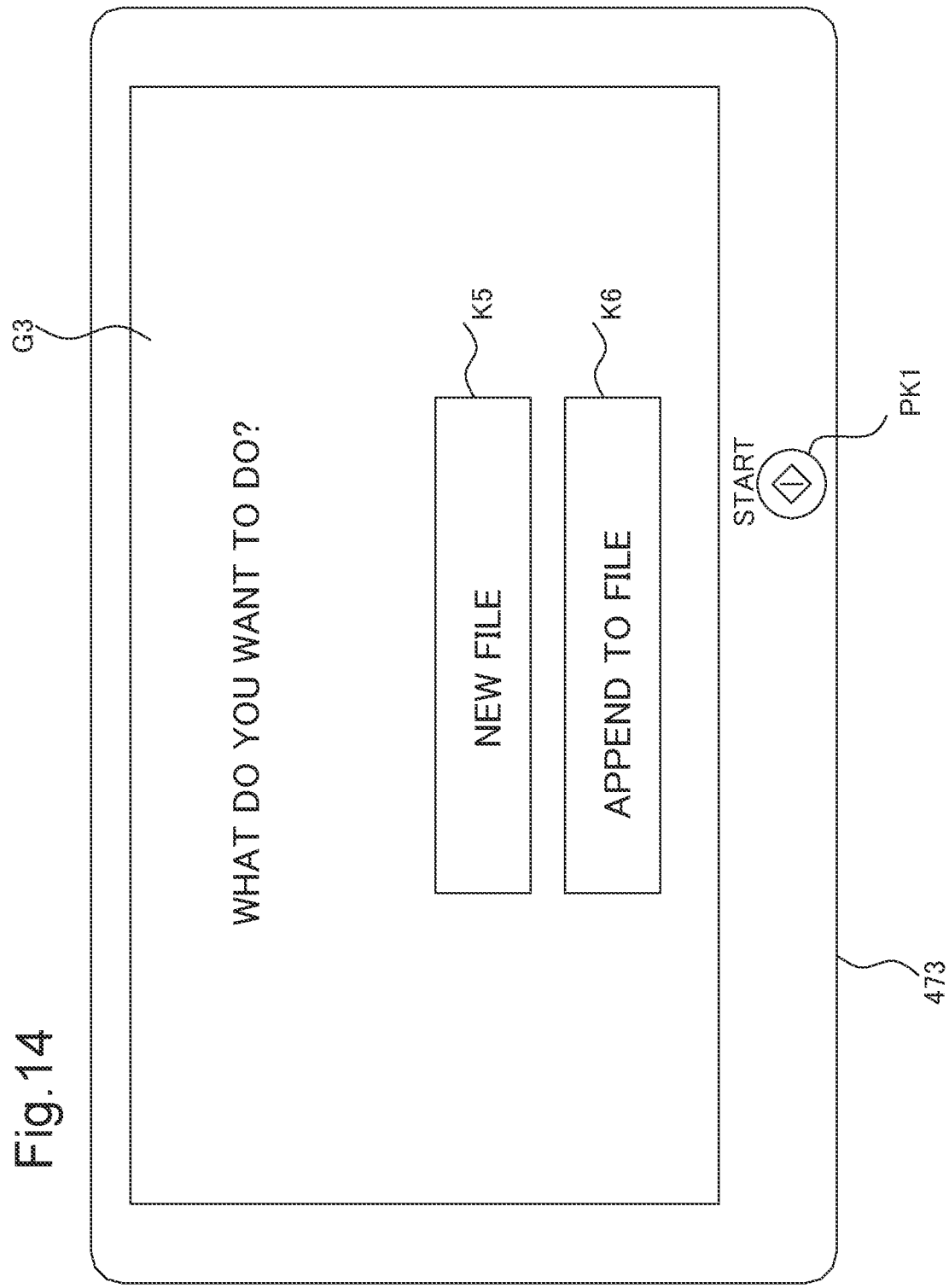
FIG. 14 is a schematic drawing showing another example of the selection screen displayed on the display device.

The operation screen G3 shown in FIG. 14 includes a selection key K5 marked as "New File", for generating a new character string file, and writing and recording the character string read from the source image in the new character string file, and a selection key K6 marked as "Append to File" (i.e., add to the existing file), for additionally writing the character string read from the source image, in the existing character string file already stored in the character string file storage device 81.

When the user touches one of the selection keys K5 and K6 in the operation screen G3, the controller 100 accepts the user's selection whether to record the character string in the new character string file, or to additionally record the character string in the existing character string file, on the basis of the information related to the selection key that has been touched (S14). To record the character string read from the source image in the character string file, the user places the source document to be read, on the document tray 61.

When the user selects to record the character string in the new character string file ("New" at S15), and then the operation device 47 receives a reading instruction, according to the user's touch on the physical key PK1, the controller 100 controls the operation of the document feeding device 6 and the document reading device 5, so as to cause the document reading device 5 to read the image of the document placed on the document tray 61 (S16). The controller 100 then analyzes the source image acquired through the reading operation by the document reading device 5, and detects the response input fields included in the source image, and the question items corresponding to the respective response input fields, according to the format information incorporated in the original source image, selected by the user at S12 (S17).

Hereunder, an exemplary method will be described, by which the controller 100 detects the combination of the response input field in which the response to be extracted is written and the question item corresponding to the response input field, for example with respect to the original source image D11 shown in FIG. 11.

The controller 100 analyzes the original source image D11, and starts to detect the highlighted response input field, from the upper left position of the original source image D11. Upon detecting the response input field, the controller 100 detects the highlighted question item located closest to the response input field that has been detected, and identifies the detected question item as the question item corresponding to the response input field detected first. Thus, the controller 100 determines the combination of the response input field and the question item.

First, the controller 100 detects the response input field EF11, and identifies the question item Q11, located closest to the response input field EF11, as the counterpart to be paired with the response input field EF11. Then the controller 100 detects the response input field EF12, and identifies the question item Q12, located closest to the response input field EF12, as the counterpart to be paired with the response input field EF12.

Further, the controller 100 detects the response input field EF13. Although the question items Q11 and Q12 are located closest to the response input field EF13, the question items Q11 and Q12 have already been paired with the response input fields EF11 and EF12, respectively. Therefore, the controller 100 identifies the question item Q13 as the counterpart to be paired with the response input field EF13. The controller 100 continues such operation, to the lower right position of the original source image D11.

The controller 100 then extracts the character string written in the response input field that has been detected (S18), and generates the character string file (S19). The controller 100 records the character string representing the detected question item, and the character string representing the response to the question item (extracted character string), in the character string file in association with each other (S20), and stores the character string file in the character string file storage device 81 (S21). Thereafter, the operation is finished.

Figure 15:
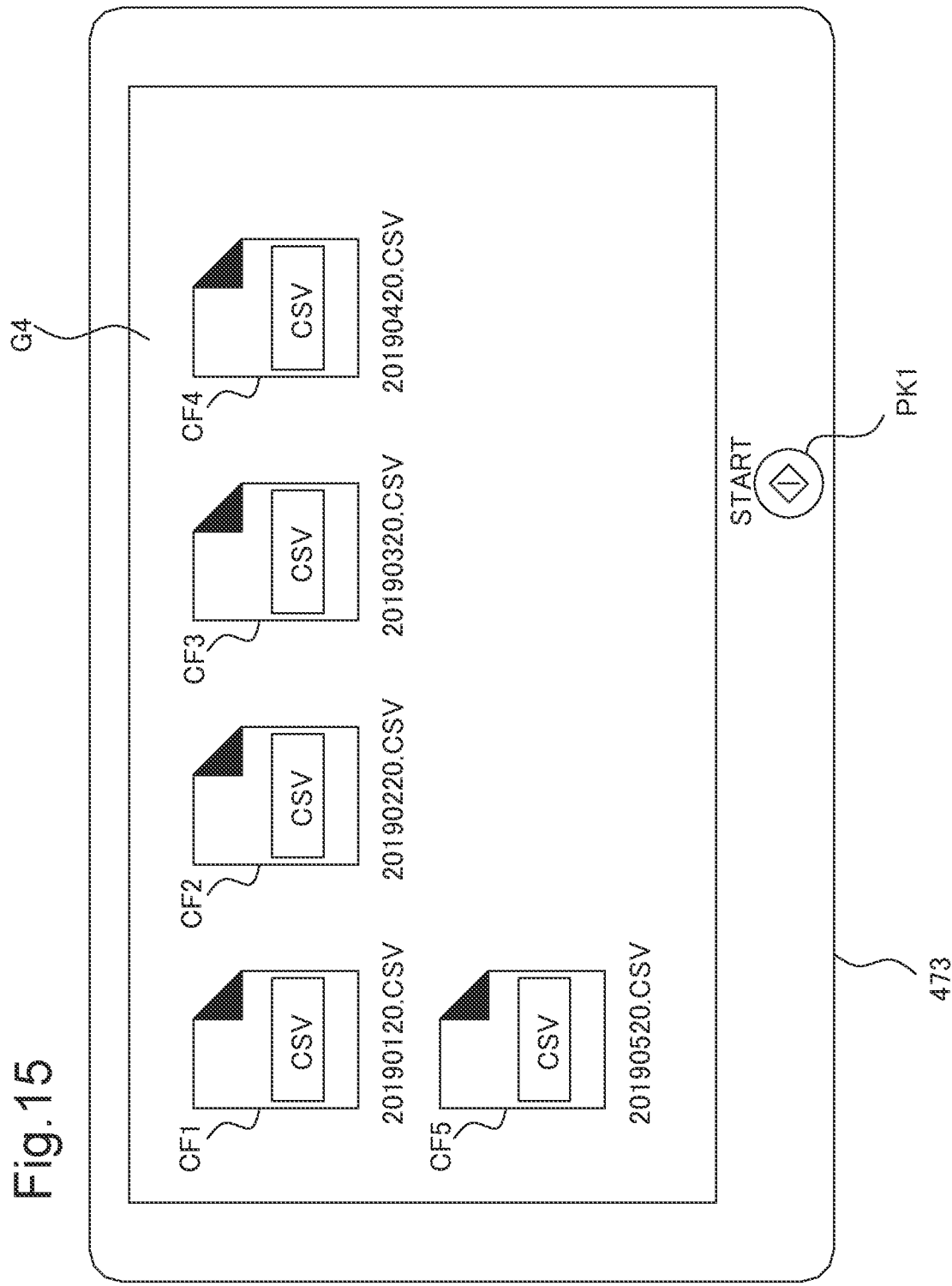
FIG. 15 is a schematic drawing showing character string files listed on the display device.

In contrast, when the user selects to additionally record the character string in the existing character string file ("Append" at S15), the controller 100 causes the display device 473 to display, as an example shown in FIG. 15, an operation screen G4 serving as a selection screen, including a list of the character string files, stored in the character string file storage device 81 (S31).

The operation screen G4 shown in FIG. 15 includes the character string files CF1 to CF5. When the user holds down one of the character string files CF1 to CF5 displayed on the display device 473, the controller 100 receives an instruction from the user to unfold the character string file that has been held down, and causes the display device 473 to display the CSV file, for example as shown in FIG. 5, representing the content of the character string file that has been held down.

When the user taps, instead of holding down, one of the character string files CF1 to CF5 displayed on the display device 473, the controller 100 accepts the selection of the character string file that has been tapped (S32). Thereafter, when the operation device 47 detects that the physical key PK1 has been touched by the user, the controller 100 controls the operation of the document feeding device 6 and the document reading device 5, so as to cause the document reading device 5 to read the image of the document placed on the document tray 61 (S33).

The controller 100 then analyzes the source image acquired through the reading operation by the document reading device 5, and detects the response input fields included in the source image, and the question items corresponding to the respective response input fields, according to the format information incorporated in the original source image, selected by the user at S12 (see FIG. 6B) (S34).

Then the controller 100 extracts the character string written in the detected response input field (S35), and additionally writes the character string representing the detected question item and the character string representing the response to the question item (extracted character string), in the character string file selected by the user at S32, in association with each other (S36). Thereafter, the operation is finished. FIG. 16 illustrates an example of the character string file, such as that shown in FIG. 5, to which the newly extracted character string has been additionally written.

The arrangement according to this embodiment enables the character string read from the source image to be additionally stored in the existing character string file, thereby reducing the data amount necessary for saving the file containing the character string that has been newly read.

On a source document (paper document) such as a questionnaire, such a layout is often adopted that the character strings each representing a question item (e.g., First Name, Last Name, and E-mail), and the response input fields in each of which a specific response to the question is to be written, are associated with each other.

Normally, reading the image of such a source document by an image processing apparatus, subjecting the read image to a character recognition process, detecting character strings representing question items and character strings representing the response to the question items, generating a file for recording those character strings and storing the file in a memory, thereby electronizing the source document, enables necessary information to be retrieved easily and quickly. In addition, the space for storing the source documents can be saved.

However, generating the file for recording the character strings each time the source document is read (scanned) leads to an increase in amount of data necessary for saving the files, thus making it difficult to effectively utilize the memory.

With the arrangement according to the foregoing embodiment, in contrast, the data amount necessary for saving the files for recording the character strings read from the source image can be reduced.

Hereunder, a merging operation of the character string files stored in the character string file storage device 81 will be described.

Figure 17A:
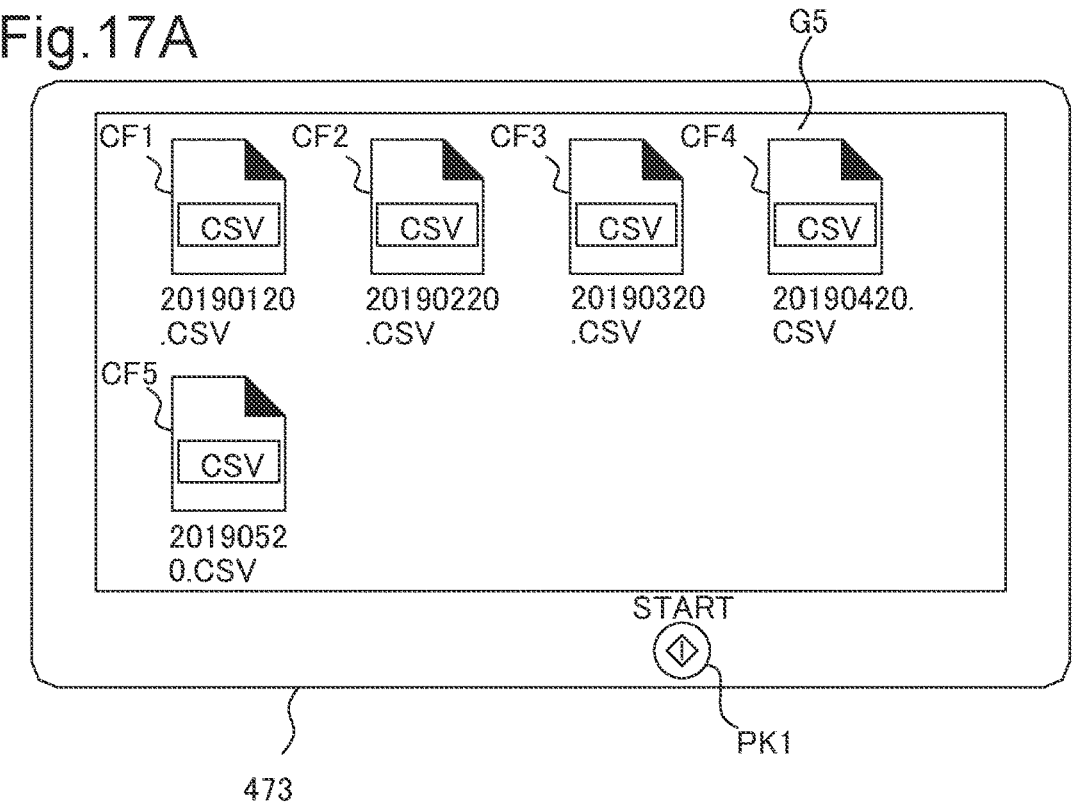
FIG. 17A is a schematic drawing showing character string files listed on the display device.

When the user inputs an instruction to merge the character string files through the touch panel, for example by touching the GUI displayed on the display device 473, the controller 100 causes the display device 473, according to the merging instruction, to display an operation screen G5 serving as a selection screen, showing a list of the character string files stored in the character string file storage device 81, as an example shown in FIG. 17A.

Figure 17B:
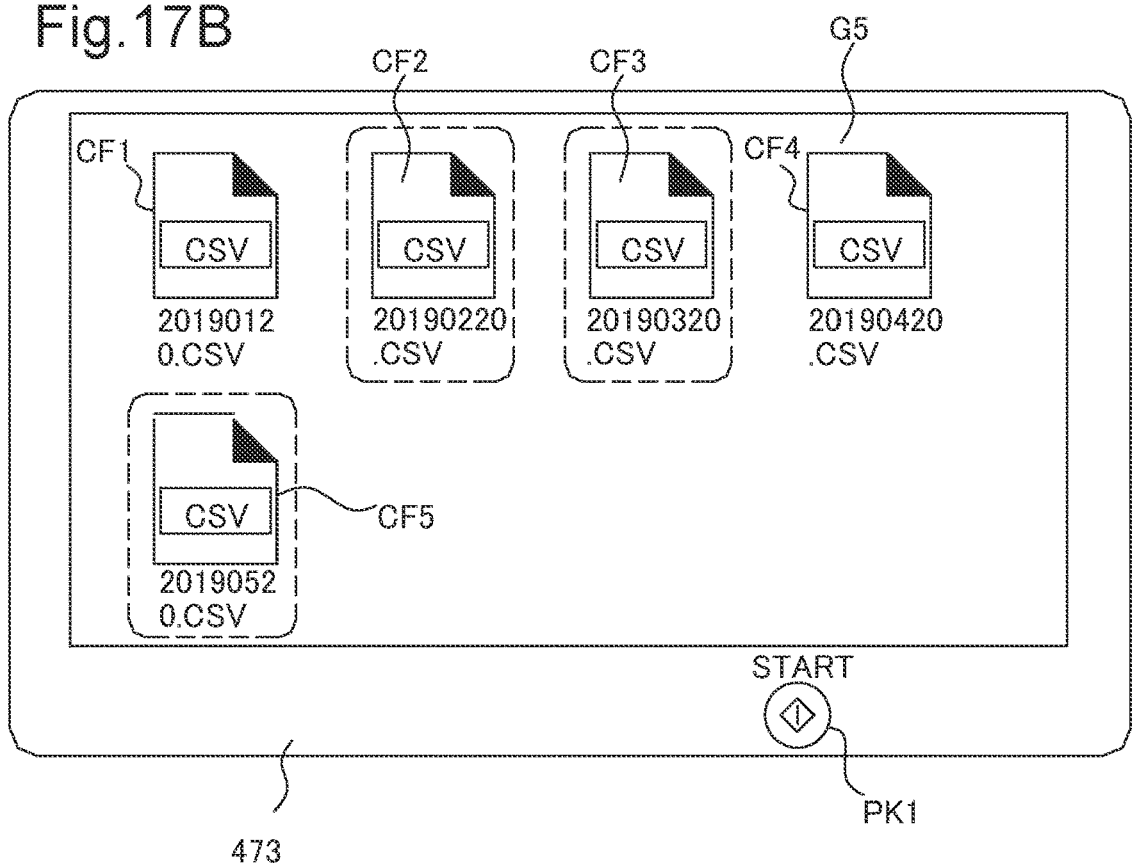
FIG. 17B is a schematic drawing showing character string files selected by the user, displayed in the highlighted state.

To merge the character string files, the user selects, for example through the touch panel, two or more character string files out of the character string files CF1 to CF5 displayed on the operation screen G5, and touches the physical key PK1 serving as the "start" key of the operation device 47. FIG. 17B illustrates the state where the character string files selected by the user are highlighted by the controller 100. In FIG. 17B, the character string files CF2, CF3, and CF5 are highlighted.

Figure 18:
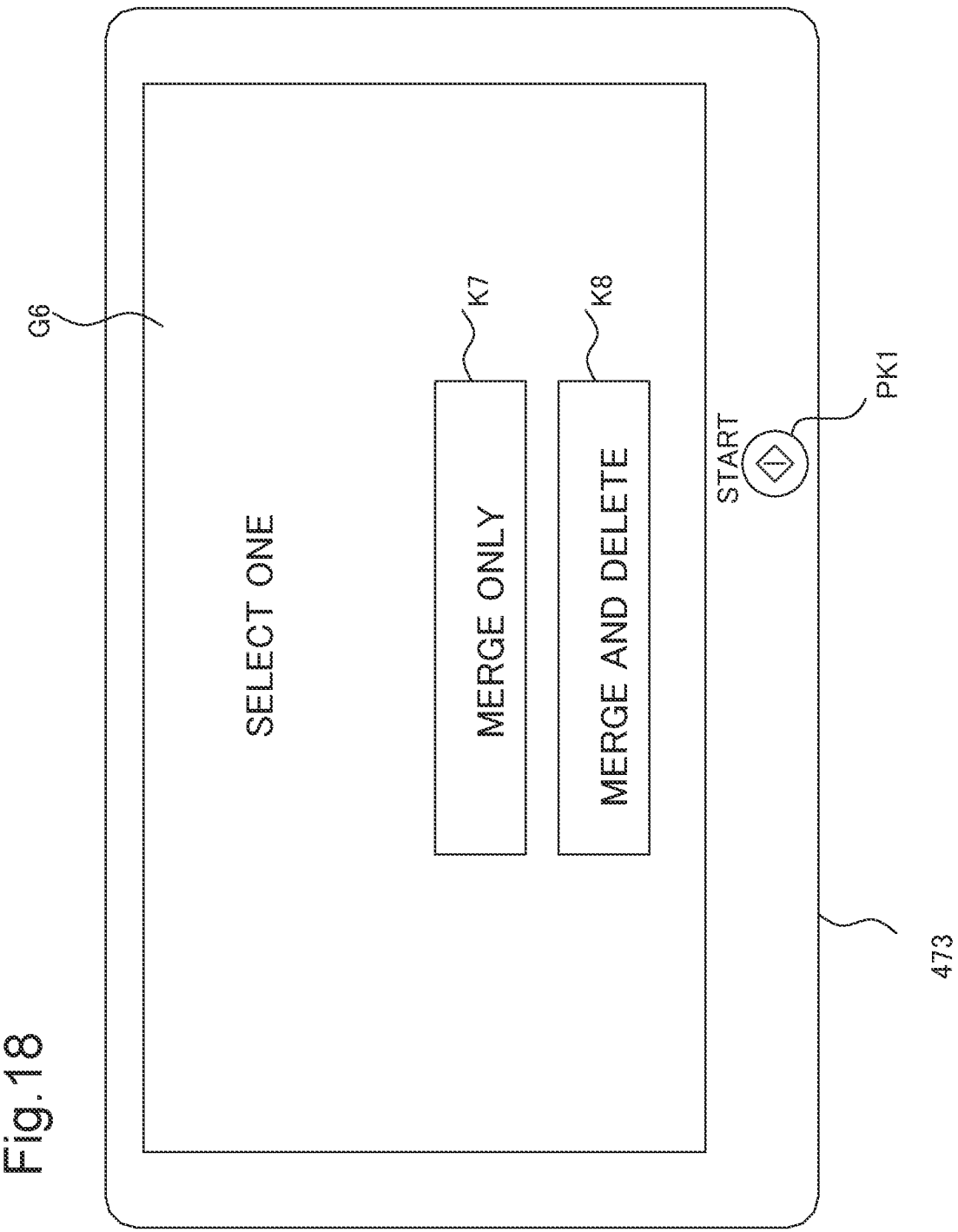
FIG. 18 is a schematic drawing showing another example of the selection screen displayed on the display device.

When the user selects the character string files, and then touches the physical key PK1, the controller 100 causes the display device 473 to display an operation screen G6 serving as a selection screen, as an example shown in FIG. 18.

The operation screen G6 shown in FIG. 18 includes a selection key K7 marked as "Merge Only", for merging a plurality of character string files selected by the user, and a selection key K8 marked as "Merge and Delete", for merging a plurality of character string files selected by the user, and further deleting the character string files that are no longer necessary.

When the user touches one of the selection keys K7 and K8 on the operation screen G6, the controller 100 accepts the user's selection whether to only merge the character string files, or to merge and delete the character string files, depending on which of the selection keys has been touched.

When the user selects "Merge Only", the controller 100 decides whether the question items recorded in the plurality of character string files selected by the user accord with each other. Upon deciding that the character string files accord with each other, the controller 100 additionally writes, in a character string file optionally selected out of the plurality of character string files (e.g., the character string file first selected by the user), the character strings representing the response to the question items in the remaining character string files, in association with the character string representing the question items recorded in the optionally selected character string file, thereby merging the character string files.

Figure 19A:
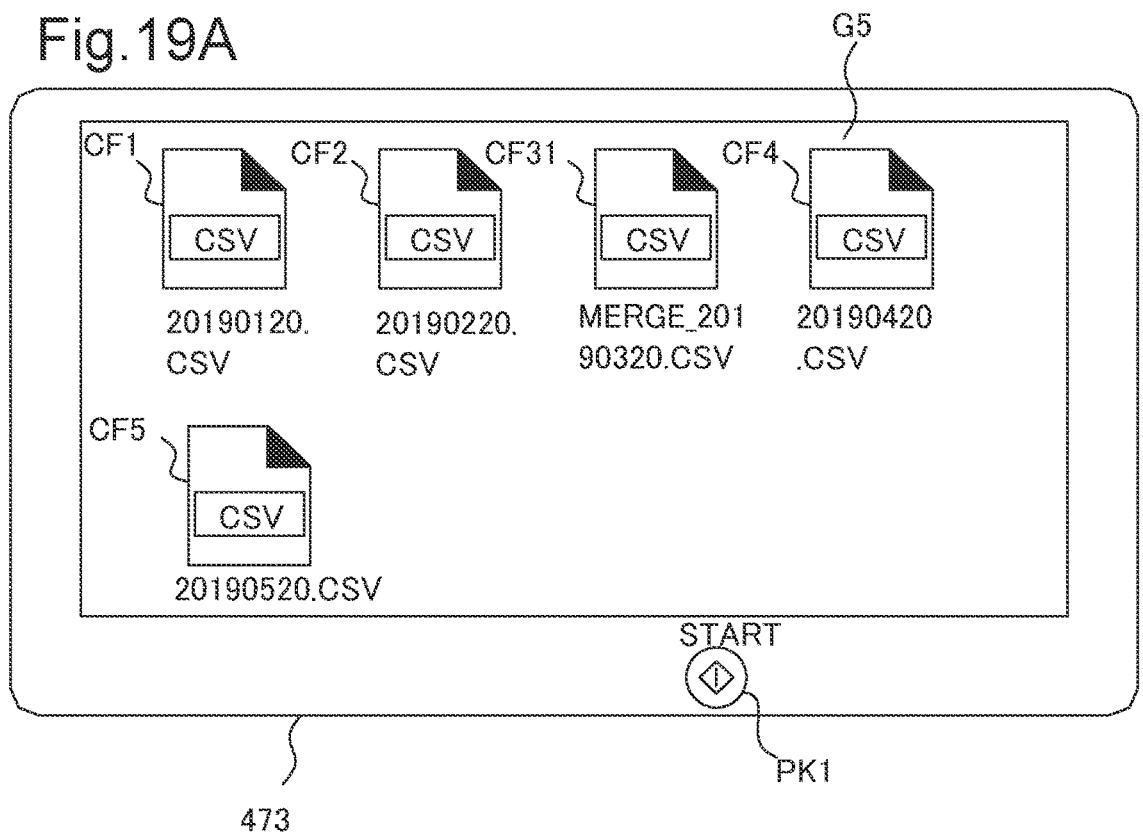
FIG. 19A and FIG. 19B are schematic drawings each showing character string files listed on the display device.

For example, when the user selects the character string file CF3 first, the controller 100 updates the character string file CF3 to a character string file CF31. After merging the character string files, the controller 100 causes the display device 473 to display a screen showing the list of the character string files, for example as shown in FIG. 19A.

In contrast, when the user selects "Merge and Delete", the controller 100 decides whether the question items recorded in the plurality of character string files selected by the user accord with each other. Upon deciding that the character string files accord with each other, the controller 100 additionally writes, in a character string file optionally selected out of the plurality of character string files, the character strings representing the response to the question items in the remaining character string files, in association with the character string representing the question items recorded in the optionally selected character string file, thereby merging the character string files and generating a new character string file. Further, the controller 100 deletes the character string files that are no longer necessary, from the character string file storage device 81.

Figure 19B:
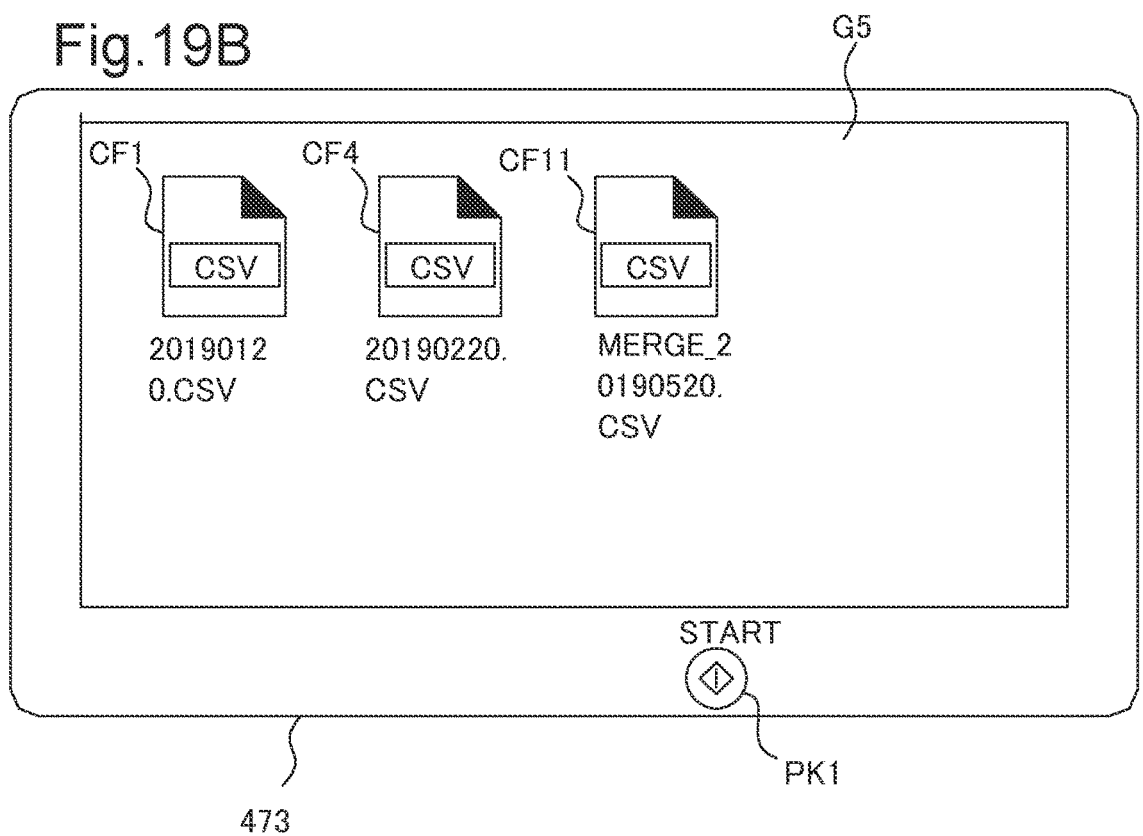

For example, the controller 100 newly generates a character string file CF11, and deletes the character string files CF2, CF3, and CF5. After merging and deleting the character string files, the controller 100 causes the display device 473 to display a screen showing the list of the character string files, for example as shown in FIG. 19B.

Merging thus the character string files thereby unifying the information improves the efficiency of searching work. In addition, deleting the character string files that are no longer necessary results in an increase in vacant region in the character string file storage device 81.

As another embodiment, the controller 100 may cause the display device 473 to display a warning message, when the user selects the character string files in which the question items discord with each other, through the screen of the display device 473 and the touch panel. In this case, the user can be made aware that the character string files in which the question items discord with each other have been selected.

Here, according to the foregoing embodiment, when the user selects the selection key K2 marked as "Use Saved Format" on the operation screen G1 shown in FIG. 7, the controller 100 causes the display device 473 to display the operation screen G2 shown in FIG. 12. When the user selects the image file through the operation screen G2, the controller 100 causes the display device 473 to display the operation screen G3 shown in FIG. 14, to provide the user with the opportunity to select whether to record the character string in the new character string file, or to additionally record the character string in the existing character string file.

However, when the image file to be utilized is stored in the format information storage device 82, it is most probable that the character string file corresponding to the format indicated by the image file is already stored in the character string file storage device 81.

Accordingly, as another embodiment, when the user selects the image file through the operation screen G2, the controller 100 may immediately select the character string file corresponding to the format indicated by the image file, from the character string file storage device 81, without causing the display device 473 to display the operation screen G3, and additionally write the character string read from the source image, in the selected character string file.

Such an arrangement allows only one character string file (CSV file) to be generated for one format. In other words, generation of a plurality of character string files for one format is restricted, which eliminates the need to execute the merging operation described above.

The disclosure may be modified in various manners, without limitation to the configuration according to the foregoing embodiments. Although the foregoing embodiment represents the image forming apparatus that includes the image processing apparatus according to the disclosure and at least the image forming device 12, the image processing apparatus according to the disclosure may be applied to a different type of electronic apparatus.

Further, the configurations and processings according to the foregoing embodiments, described with reference to FIG. 1 to FIG. 19, are merely exemplary and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An image processing apparatus comprising:
a character string file storage device for storing a character string file in which a character string representing a question item, and a character string representing a response to the question item are registered in association with each other;
an operation device that receives an input;
a document reading device that reads an image of a source document; and
a control device including a processor, and configured to act, when the processor executes a control program, as a controller that:
analyzes a source image acquired through a reading operation by the document reading device;
detects, on a basis of predetermined format information indicating a response input field in which a response to be extracted from the source image is written, and the question item corresponding to the response input field, the response input field and the question item contained in the source image;
extracts the character string representing the response written in the response input field; and
additionally writes the extracted character string, in the character string file already stored in the character string file storage device and designated by a user through the operation device, in association with the character string representing the question item, recorded in the character string file,
wherein the character string file includes a file of a comma separated value (CSV) format, and
wherein, when the character string extracted from the response input field includes a comma, the controller further encloses the character string in a predetermined symbol, before writing the character string in the character string file.

2. An image processing apparatus comprising:
a character string file storage device for storing a character string file in which a character string representing a question item, and a character string representing a response to the question item are registered in association with each other;
an operation device that receives an input;
a document reading device that reads an image of a source document; and
a control device including a processor, and configured to act, when the processor executes a control program, as a controller that:
analyzes a source image acquired through a reading operation by the document reading device;
detects, on a basis of predetermined format information indicating a response input field in which a response to be extracted from the source image is written, and the question item corresponding to the response input field, the response input field and the question item contained in the source image;
extracts the character string representing the response written in the response input field; and
additionally writes the extracted character string, in the character string file already stored in the character string file storage device and designated by a user through the operation device, in association with the character string representing the question item, recorded in the character string file,
wherein the controller further merges the character string files, by additionally writing, in one character string file optionally selected from the plurality of character string files, selected by the user through the operation device and in which the recorded question items accord with each other, the character string representing the response to the question item recorded in the other character string files, in association with the character string representing the question item recorded in the optionally selected character string file.

3. The image processing apparatus according to claim 2, further comprising a display device,
wherein the controller causes the display device to display a warning message, when the character string files in which the question items discord with each other are selected by the user through the operation device.

4. An image processing apparatus comprising:
a character string file storage device for storing a character string file in which a character string representing a question item, and a character string representing a response to the question item are registered in association with each other;

an operation device that receives an input;

a document reading device that reads an image of a source document;

a control device including a processor, and configured to act, when the processor executes a control program, as a controller that:

analyzes a source image acquired through a reading operation by the document reading device;

detects, on a basis of predetermined format information indicating a response input field in which a response to be extracted from the source image is written, and the question item corresponding to the response input field, the response input field and the question item contained in the source image;

extracts the character string representing the response written in the response input field; and additionally writes the extracted character string, in the character string file already stored in the character string file storage device and designated by a user through the operation device, in association with the character string representing the question item, recorded in the character string file;

a format information storage device in which the format information is stored; and a display device, wherein the controller further causes the display device to display an original source image that serves as a base of the format information, and stores information indicating the response input field and the question item included in the original source image designated by the user through the operation device, in the format information storage device, as the format information.

5. The image processing apparatus according to claim 4, wherein the controller incorporates the format information in the original source image, and stores the original source image in the format information storage device.

6. The image processing apparatus according to claim 4, wherein the controller accepts, through the operation device, designation of two or more of the response input fields, located adjacent to each other and included in the original source image, as one response input field.

7. The image processing apparatus according to claim 4, wherein the controller further detects the response input field included in the source image and the question item corresponding to response input field, on a basis of the format information designated by the user through the operation device, and extracts the character string representing the response written in the response input field.

\* \* \* \* \*